US008400761B2

(12) United States Patent
Yamagiwa et al.

(10) Patent No.: US 8,400,761 B2
(45) Date of Patent: Mar. 19, 2013

(54) PORTABLE TERMINAL

(75) Inventors: Daisuke Yamagiwa, Osaka (JP); Yasuhiro Shingin, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 212 days.

(21) Appl. No.: 12/880,569

(22) Filed: Sep. 13, 2010

(65) Prior Publication Data

US 2011/0063785 A1 Mar. 17, 2011

(30) Foreign Application Priority Data

Sep. 15, 2009 (JP) ................................ 2009-212807

(51) Int. Cl.
*G06F 1/16* (2006.01)

(52) U.S. Cl. ........ 361/679.01; 455/566; 16/47; 248/422

(58) Field of Classification Search ............... 455/575.1, 455/575.2, 575.3, 575.4, 575.5, 575.7, 566, 455/556.1; 396/283; 16/397, 45, 47; 345/1.1, 345/1.3, 173, 184; 248/371, 125.1, 639, 248/68.1, 422; 361/679.01, 679.09, 679.23, 361/679.27, 690, 695, 810

See application file for complete search history.

(56) References Cited

U.S. PATENT DOCUMENTS

| 8,042,231 | B2 * | 10/2011 | Bae et al. ...................... 16/367 |
|---|---|---|---|
| 2005/0266897 | A1 | 12/2005 | Ahn et al. |
| 2006/0140618 | A1 * | 6/2006 | Kamei ........................... 396/283 |
| 2007/0010301 | A1 * | 1/2007 | Kim ........................... 455/575.5 |
| 2007/0099453 | A1 | 5/2007 | Park |
| 2008/0261666 | A1 | 10/2008 | Niitsu et al. ............... 455/575.4 |

FOREIGN PATENT DOCUMENTS

| EP | 1 777 921 A2 | 4/2007 |
|---|---|---|
| JP | 2007-116709 | 5/2007 |

OTHER PUBLICATIONS

Office Action dated Dec. 4, 2012 from the Japanese Patent Office in a Japanese counterpart application.

\* cited by examiner

*Primary Examiner* — Hung Duong

(74) *Attorney, Agent, or Firm* — Morgan, Lewis & Bockius LLP

(57) ABSTRACT

A portable terminal according to the present invention has a first casing, a second casing and a third casing overlapped in the order from the bottom toward the top. And the portable terminal according to the present invention includes: a slide section slidably coupling the first casing and the second casing; a first hinge section rotatably coupling the second casing and the third casing around a first rotation axis; and a second hinge section that enables the third casing to be rotatable relative to the second casing around a second rotation axis that is approximately perpendicular to the first rotation axis.

3 Claims, 5 Drawing Sheets

PORTABLE TERMINAL

This application is based on Japanese Patent Application No. 2009-212807 filed on Sep. 15, 2009, the contents of which are hereby incorporated by reference.

BACKGROUND OF THE INVENTION

1. Field of the Invention

The present invention relates to a portable terminal such as, for example, a cellular phone, PDA and smartphone.

2. Description of Related Art

In recent years, portable terminals have increasingly been required multi-functionality as represented by, for example, smartphones. Although some of conventional portable terminals have display units slidably opening/closing only in the direction of the longer sides, such a configuration may face a problem that it cannot be well adapted to functional diversification.

To solve such a problem, Japanese Patent Publication No. 2007-116709 discloses a portable terminal that is laterally foldable as well as longitudinally slidable to meet various functions. FIGS. 8A, 8B and 8C are schematic perspective views, showing a configuration of a conventional portable terminal, where FIG. 8A shows the portable terminal in the closed state, FIG. 8B in an open state after sliding a second casing relative to a first casing, and FIG. 8C in another open state after rotating, with a hinge, the first casing relative to the second casing.

As shown in FIGS. 8A, 8B and 8C, the conventional portable terminal 100 comprises a first casing 110 and a second casing 120. The first casing 110 comprises an upper casing 111 having a front display 113 in the front face thereof, and a lower casing 112 that is mounted to the upper casing 111 and has a rear display 114. The second casing 120 comprises an upper casing 121 having a keypad 123 in the front face thereof, and a lower casing 122 that is mounted to the upper casing 121 and accommodates a battery.

Between the first casing 110 and the second casing 120, a slide module (only a part of which is shown in FIGS. 8A, 8B and 8C) is provided to realize the open states as in FIGS. 8B and 8C. The slide module comprises a hinge member 131 rotatably coupled to hinge coupling section 115 of the first casing 110, a slide member (not shown) to which the hinge member 131 is fixed, and a slide rail (not shown) which the slide member is slidably mounted to and which is fixed to the second casing 120.

With such a configuration, when the portable terminal 100 is used in a communication mode, a part of keypad 123 is exposed (the state of FIG. 8B) with the slide mechanism, and when the terminal is used in a mode for watching a moving image or gaming, entire keypad 123 is exposed (the state of FIG. 8C) with rotation movement with the hinge. Therefore, the conventional portable terminal 100 advantageously meets various functions.

SUMMARY OF THE INVENTION

The configuration of the Japanese Patent Publication No. 2007-116709 may need to be improved in some points as mentioned below.

When the conventional portable terminal 100 is used in open states as shown in FIGS. 8B and 8C, the directions of the displays 113 and 114 when used will be different. In other words, the display 113 will be used in a portrait view in the state of FIG. 8B, and the display 114 will be used in a landscape view in the state of FIG. 8C. Nevertheless, keypad 123 has to be used commonly in both states of FIGS. 8B and 8C, where use of keypad 123 will be difficult in either state.

Considering the trend of multi-functionality, it may be preferable to increase the number of keys on the keypad 123 as many as possible, but it will be difficult to further increase the number of keys on the conventional portable terminals 100. The conventional portable terminal 100 comprises expensive two displays 113 and 114, which will be disadvantageous in terms of cost.

The objective of the present invention is to provide a portable terminal that is equipped with a single display screen and that can appropriately be adaptable to multi-functionality.

To achieve the above objective, a portable terminal according to the present invention, which has a first casing, a second casing and a third casing overlapped in the order from the bottom toward the top, includes a slide section slidably coupling the first casing and the second casing, a first hinge section rotatably coupling the second casing and the third casing around a first rotation axis, and a second hinge section that enables the third casing to be rotatable relative to the second casing around a second rotation axis that is approximately perpendicular to the first rotation axis.

In the present configuration, the portable terminal includes three casings, enabling slide movement by a slide section and rotation movement by two types of hinge sections. Thus, a multi-functional portable terminal capable of switching between multiple states can be realized by providing two casings out of the three with input keys and providing the remaining one with a display screen. It will be easier with a portable terminal in the present configuration to increase the number of input keys to adapt to multi-functionality and to adapt to changes of the direction of the display screen (whether the display screen is used in a portrait view or a landscape view) because the portable terminal has two casings on which input keys are provided.

In a portable terminal with the above configuration, it is preferable that the first rotation axis is approximately parallel to the sliding direction of the slide section.

In a portable terminal with the above configuration, the first casing may be provided with a first input key group that is switchable between a covered state and an exposed state with slide movement using the slide section, the second casing may be provided with a second input key group that is switchable between a covered state and an exposed state with rotation movement using the first hinge section, and the third casing may be provided with a display screen.

In a portable terminal with the above configuration, the display screen may be approximately rectangular, and the sliding direction of the slide section and the first rotation axis may be approximately parallel to the direction of the longer sides of the display screen.

A portable terminal in such a configuration provides uses, for example, as described below. That is to say, a portable terminal according to the present configuration can be used as a telephone, for example, by exposing the first input key group configured as a numeric keypad with slide movement in the direction of the longer sides. Furthermore, a portable terminal in the present configuration enables input operation of many letters (such as mail creation) by opening the third casing relative to the second casing with rotation movement of the first hinge section so as to expose the second input key group, which has a similar configuration to a full keyboard, for example, of a personal computer (PC). It is noted that the third casing is rotatable relative to the second casing and that the rotation movement enables the display screen to be readable during letter input operation. Furthermore, the portable terminal can be switched to a state where the input key groups and the display screen are covered so that it can be carried in a state it is compact and the display screen is protected.

As mentioned above, the present invention can provide a portable terminal that is equipped with a single display screen that can appropriately be adaptable to multi-functionality.

DETAILED DESCRIPTION OF PREFERRED EMBODIMENTS

A portable terminal of an embodiment of the present invention is now described in detail below with reference to the accompanying drawings. The portable terminal of the present invention is realized, for example, as a cellular phone, a PHS (Personal Handy-phone System) terminal, a PDA (Personal Digital Assistant), a smartphone, a PC (Personal Computer) and a portable game device.

Figure 1:
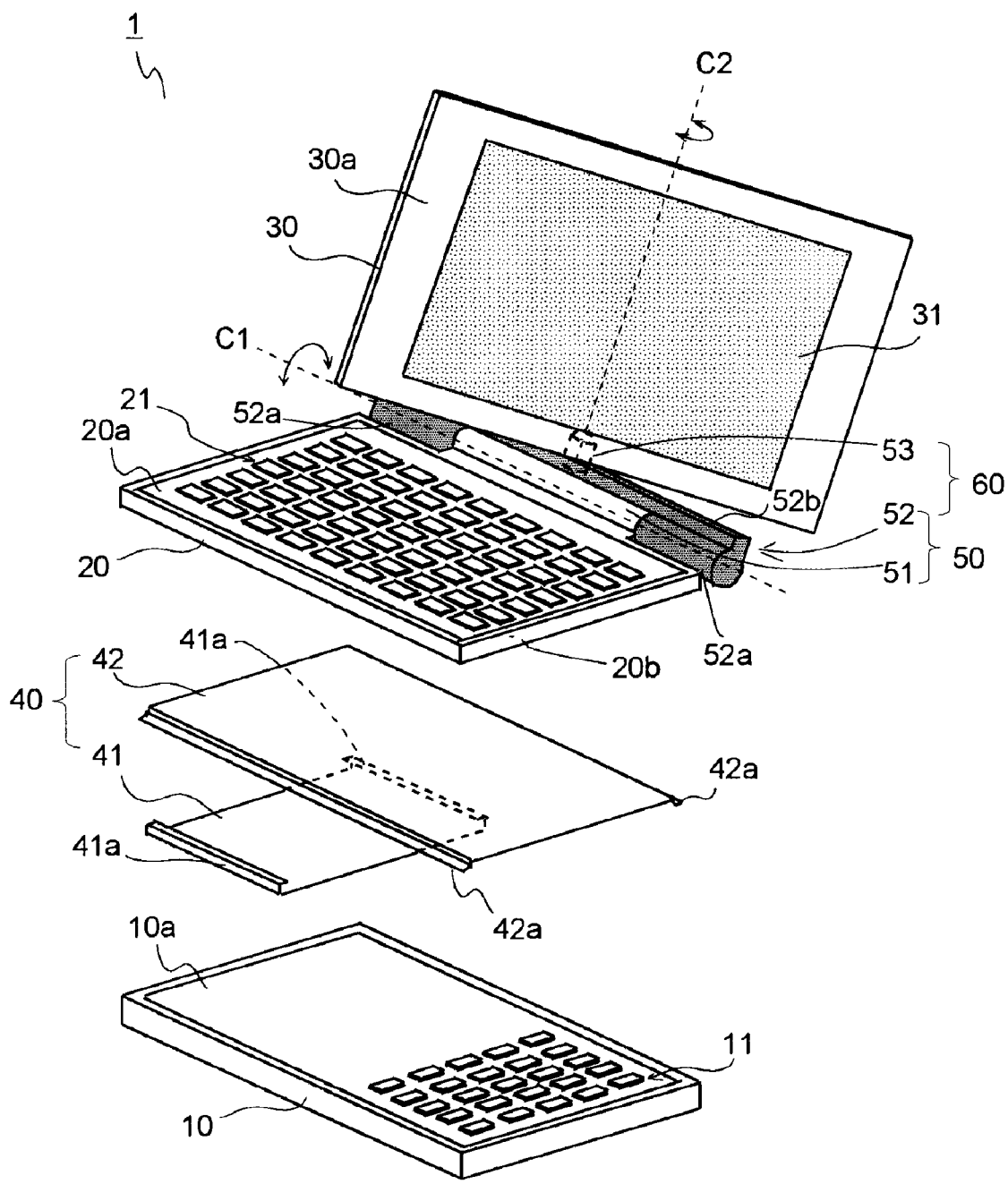
FIG. 1 is an exploded perspective view illustrating the schematic configuration of a portable terminal of an embodiment of the present invention.

FIG. 1 is an exploded perspective view illustrating the schematic configuration of a portable terminal of an embodiment of the present invention. As shown in FIG. 1, the portable terminal 1 of the present embodiment comprises a casing 10 for simple operation, a casing 20 for complicated operation that is overlapped on the casing 10 for simple operation, and the casing for display 30 that is overlapped on the casing 20 for complicated operation. The casing 10 for simple operation, the casing 20 for complicated operation and the casing for display 30 are embodiments of the first casing, the second casing and the third casing of the present invention, respectively.

The casing 10 for simple operation, which is formed, for example, of synthetic resin or metal, has the shape of an approximately rectangular parallelepiped. An approximately half area of the top face 10a of the casing 10 for simple operation is provided with a first input key group 11. The user can use the first input key group 11 to perform simple operation for inputting information of a relatively small volume.

The configuration of the first input key group 11 shown in FIG. 1 is an example and the configuration for the first input key group 11 may be changed properly to meet functions of the portable terminal 1.

The casing 20 for complicated operation, which is formed, for example, of synthetic resin or metal, has the shape of an approximately rectangular parallelepiped. In the portable terminal 1 of the present embodiment, the casing 10 for simple operation and the casing 20 for complicated operation are both approximately rectangular in a planar view from above and have approximately the same longitudinal and lateral lengths.

Most part of the top face 20a of the casing 20 for complicated operation is provided with a second input key group 21. The number of input keys accommodated in the second input key group 21 is larger than that of input keys accommodated in the first input key group 11 provided on the casing 10 for simple operation. The user can use the second input key group 21 to perform complicated operation for inputting information of a relatively large volume.

The casing for display 30, which is formed, for example, of synthetic resin or metal, has the shape of an approximately rectangular parallelepiped. In the portable terminal 1 of the present embodiment, the casing for display 30 also has approximately the same longitudinal and lateral lengths as those of the casing 10 for simple operation in a planer view from above. The casing for display 30 accommodates a display unit comprising, for example, a liquid crystal display, so that an approximately rectangular display screen 31 is laid out on a face 30a of the casing for display 30.

Between the casing 10 for simple operation and the casing 20 for complicated operation, a slide section 40 is disposed that mutually slidably couples the casing 10 for simple operation and the casing 20 for complicated operation. The slide section 40 has a first plate 41, on which recessed engaging sections 41a in an approximately C-shape in a planer view are formed at the both ends of the first plate 41 in the direction parallel to the direction of the shorter sides of the casing 10 for simple operation. The slide section 40 also has a second plate 42, on which engaging risings 42a are formed at two ends of the second plate 42 so as to match the recessed engaging sections 41a of the first plate 41.

By engaging the engaging risings 42a of the second plate 42 with the recessed engaging sections 41a of the first plate 41, the first plate 41 and the second plate 42 are slidably coupled with each other. The first plate 41 is fixedly disposed on the approximately half area of the top face 10a of the casing 10 for simple operation where the first input key group 11 is not provided. The second plate 42 is fixedly disposed over a large area of the bottom face 20b of the casing 20 for complicated operation. Therefore, the casing 10 for simple operation and the casing 20 for complicated operation are slidably coupled with each other. The slide range may be adjusted, for example, by disposing a stopper at an appropriate location.

When adopting a configuration where the form of a portable terminal can be changed with slide movement from the closed state to the open state or from the open state to the closed, it is preferable to have a configuration that allows spontaneous slide movement when pushed to the opening or the closing direction. For this reason, the slide section 40 preferably includes a biasing unit for enabling such spontaneous slide movement. Here, the closed state refers to the state where the first input key group 11 is covered with the casing 20 for complicated operation and the open state refers to the state where the first input key group 11 is exposed.

The side face of a longer side of the casing 20 for complicated operation is provided with a first axis section 51, which is approximately cylindrical. The first axis section 51 may be provided integratedly with the casing 20 for complicated operation or may be provided as a separate member fixedly disposed on the casing 20 for complicated operation, as far as the first axis section 51 is in a fixed condition relative to the casing 20 for complicated operation.

A rotatable member 52 comprising a pair of bearing sections 52a and a coupling section 52b for coupling the pair of the bearing sections 52a is rotatably supported relative to the first axis section 51 by fitting the pair of the bearing sections 52a with the both ends of the first axis section 51. The rotatable member 52 is rotatable around the first rotation axis C1 passing through the center of the first axis section 51.

On the coupling section 52b of the rotatable member 52, a second axis section 53 fixedly disposed on the casing for display 30 is rotatably supported around the second rotation axis C2 that passes through the center of the second axis section 53. The second axis section 53 may be provided integratedly with the casing for display 30 or may be provided as a separate member from the casing for display 30. The second axis section 53 is provided such that the second rotation axis C2 passing through the center of the second axis section 53 is approximately perpendicular to the first rotation axis C1.

Thus the casing 20 for complicated operation and the casing for display 30 are rotatably coupled around the first rotation axis C1 with the first hinge section 50 comprising the first axis section 51 and the rotatable member 52. Similarly, the casing for display 30 is rotatable relative to the casing 20 for complicated operation around the second rotation axis C2 with the second hinge section 60 comprising the second axis section 53 and the rotatable member 52.

In the present embodiment, the ranges of rotation angles of the casing for display 30 using the first hinge section 50 and the second hinge section 60 are approximately 180 degrees, respectively, relative to the casing 20 for complicated operation, but the ranges can be changed as needed. The ranges of rotation angles may be adjusted, for example, by providing stoppers at appropriate locations.

It is preferable to include a position-free holding mechanism on the first hinge section 50 for holding the casing for display 30 at arbitrary angles relative to the casing 20 for complicated operation. The second hinge section 60, which enables the casing for display 30 to be rotated relative to the casing 20 for complicated operation, does not necessarily require a position-free holding mechanism, because the casing for display 30 will normally be used at a rotation angle of either 0 or 180 degrees. It is preferable, however, to configure the second hinge section 60 such that the rotation angle can be maintained at angles of 0 and 180 degrees without the support of the user.

The Portable terminal 1 of the present embodiment needs to send to the casing for display 30 the information inputted at input key groups 11 and 21 provided on the casing 10 for simple operation and the casing 20 for complicated operation, respectively. For this, an electronic circuit (not shown) installed in the casing 10 for simple operation is electrically connected to an electronic circuit (not shown) installed in the casing 20 for complicated operation with a flexible printed circuit (not shown). The electronic circuit installed in the casing 20 for complicated operation is also electrically connected to an electronic circuit (not shown) installed in the casing for display 30 with a flexible printed circuit (not shown), a part of which is incorporated in the first hinge section 50 and the second hinge section 60.

Next, operation of the portable terminal 1 of the present embodiment as configured above is explained showing various modes of use.

Figure 2:
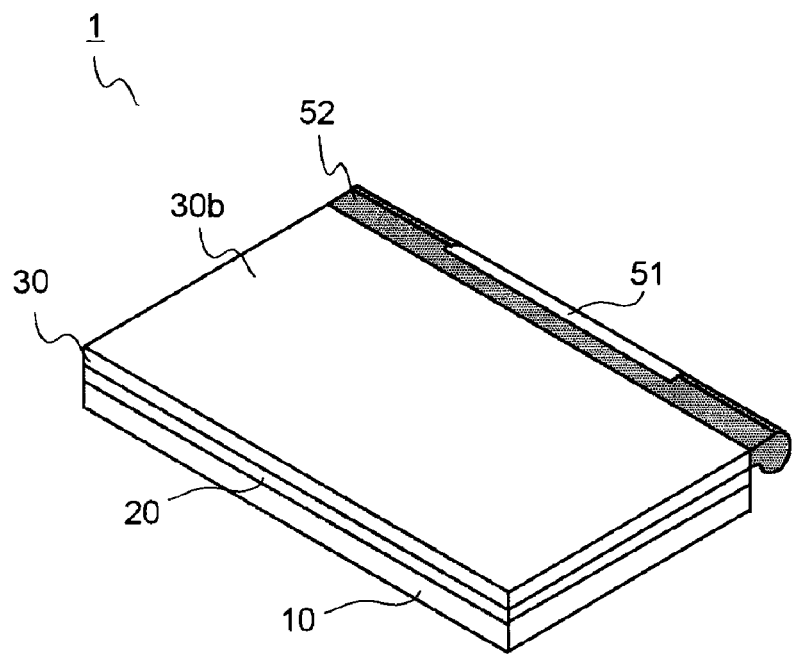
FIG. 2 is a schematic perspective view illustrating a first mode of use of the portable terminal of the present embodiment.

FIG. 2 is a schematic perspective view illustrating a first mode of use of the portable terminal of the present embodiment. In the first mode of use, the casings 10 and 20 are overlapped such that the four corners of the casing 10 for simple operation and those of the casing 20 for complicated operation are at approximately the same locations in a planar view, where the first input key group 11 provided on the casing 10 for simple operation is covered with the casing 20 for complicated operation. At the same time, the four corners of the casing 20 for complicated operation and those of the casing for display 30 are also overlapped, where the second input key group 21 provided on the casing 20 for complicated operation is covered with the casing for display 30. The casing for display 30 is in the state where the back side 30b of the face 30a (refer to FIG. 1) provided with the display screen 31 faces outside (the state where the display screen 31 and the second input key group 21 are opposed each other).

The first mode of use is a state where the input key groups 11 and 21 are covered, which is a convenient state, for example, for carrying the portable terminal 1 without use. The first mode of use advantageously protects the display screen 31 when carrying because the display screen 31 is covered inside.

Figure 3:
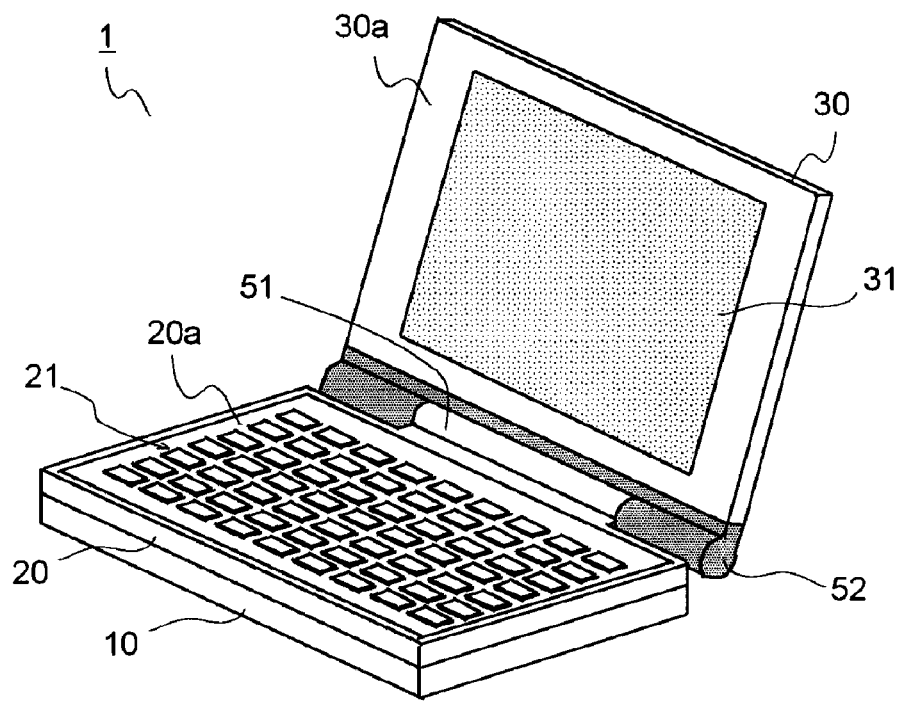
FIG. 3 is a schematic perspective view illustrating a second mode of use of the portable terminal of the present embodiment.

FIG. 3 is a schematic perspective view illustrating a second mode of use of the portable terminal of the present embodiment. This mode can be achieved from the first mode of use shown in FIG. 2 by rotating the casing for display 30 around the first rotation axis C1 (refer to FIG. 1) relative to the casing 20 for complicated operation. In other words, the rotation movement can be achieved by rotating rotatable member 52 coupled to the casing for display 30 relative to the first axis section 51. That is to say, this rotation movement is enabled by the first hinge section 50 comprising the first axis section 51 and the rotatable member 52.

The second mode of use is a state where the second input key group 21 having many input keys is exposed and the display screen 31 can also be seen. Therefore, the second mode of use conveniently allows the user, for example, to create a long mail, while watching the display screen 31 (display screen in a landscape view) in front of the user, by operating the nearer second input key group 21. For this, it is preferable to adopt an input key group, for example, similar to a full keyboard of a personal computer as the second input key group 21 of the portable terminal 1 of the present embodiment.

Figure 4:
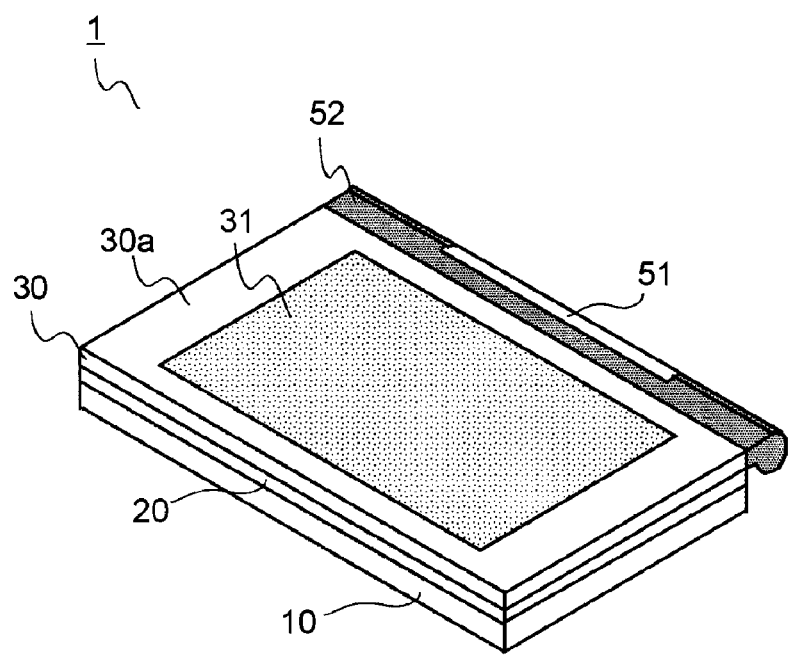
FIG. 4 is a schematic perspective view illustrating a third mode of use of the portable terminal of the present embodiment.

FIG. 4 is a schematic perspective view illustrating a third mode of use of the portable terminal of the present embodiment. This mode can be achieved from the second mode of use shown in FIG. 3 by rotating the casing for display 30 by 180 degrees around the second rotation axis C2 (refer to FIG. 1) relative to the casing 20 for complicated operation and then rotating the casing for display 30 around the first rotation axis C1 relative to the casing 20 for complicated operation so that it is shifted to the closed state. The closed state here means that the casings 20 and 30 are overlapped such that the four corners of the casing 20 for complicated operation and those of the casing for display 30 are at approximately the same locations in a planar view, where the second input key group 21 provided on the casing 20 for complicated operation is covered.

To describe the above rotation movement differently, starting from the second mode of use, the second axis section 53

(refer to FIG. 1) fixed to the casing for display 30 is rotated by 180 degrees relative to the rotatable member 52. Then, the third mode of use can be achieved by rotating the rotatable member 52 coupled to the casing for display 30 relative to the first axis section 51 in the direction to close it. That is to say, the third mode of use can be achieved from the second mode of use by activating the function of second hinge section 60 comprising the second axis section 53 and rotatable member 52 (refer to FIG. 1) and then activating the function of the first hinge section 50 comprising the first axis section 51 and rotatable member 52, sequentially.

In the third mode of use, the user can watch the display screen 31 but cannot perform input operation because the input key groups 11 and 21 are covered. The third mode of use conveniently allows the user, for example, to use the portable terminal 1 in the standby state without using it or to watch the display screen 31 in a state where the input key groups 11 and 21 are covered as in the case of watching a moving image.

Figure 5:
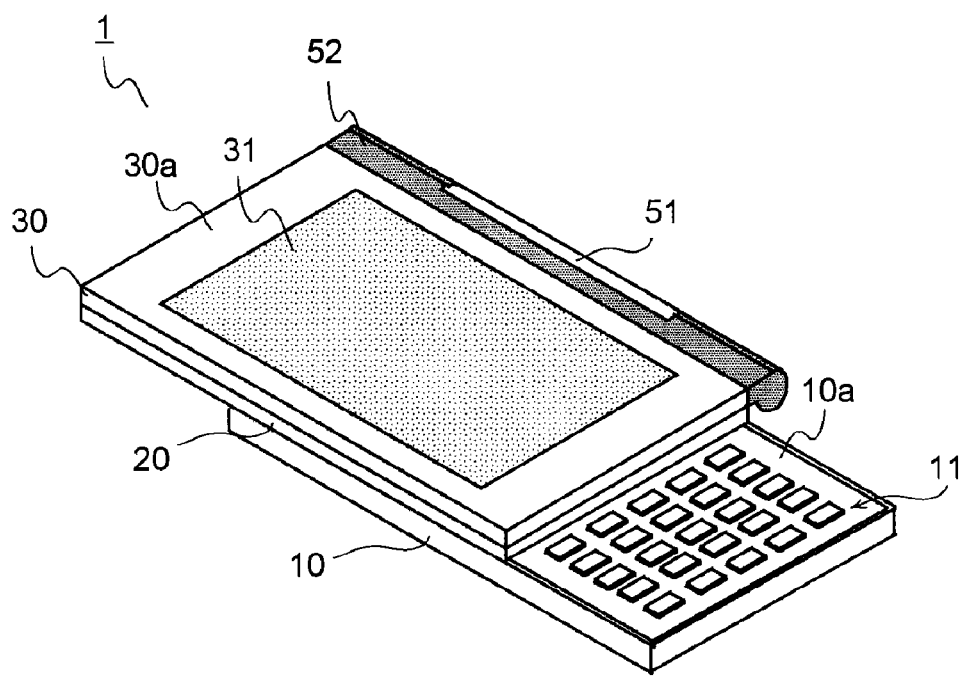
FIG. 5 is a schematic perspective view illustrating a fourth mode of use of the portable terminal of the present embodiment.

FIG. 5 is a schematic perspective view illustrating a fourth mode of use of the portable terminal of the present embodiment. This mode can be achieved from the third mode of use shown in FIG. 4 by sliding the casing 10 for simple operation relative to the casing 20 for complicated operation (it may be expressed as "by sliding the casing 20 for complicated operation relative to the casing 10 for simple operation") in the direction of the longer sides. In other words, the slide movement can be achieved by sliding the first plate 41 fixed to the casing 10 for simple operation relative to the second plate 42 fixed to the casing 20 for complicated operation in the direction of the longer sides. That is to say, this slide movement is enabled by the slide section 40 comprising the first plate 41 and the second plate 42.

The fourth mode of use is a state where the first input key group 11 having relatively fewer input keys is exposed and the display screen 31 can also be seen. Therefore, the fourth mode of use conveniently allows the user, for example, to make a phone call or to change settings of the portable terminal 1, while watching the display screen 31 (display screen in a portrait view), by operating the nearer first input key group 11. Since the first input key group 11 is provided for simple operation, it may be in the form of, for example, a numeric keypad.

As mentioned above, it will be easier with the portable terminal 1 of the present embodiment to increase the number of input keys to meet multi-functionality of portable terminals because it has two casings on which input key groups are provided. Due to the configuration, which allows input key groups provided on two casings to be exposed in different manners from the covered state, it would be easier to arrange input key groups individually suitable for cases where the display screen 31 is used in a portrait view and cases where the display screen 31 is used in a landscape view. Although only one display screen is available on the portable terminal 1, it advantageously provides various uses.

It should be understood that the embodiment described above is an example of a portable terminal to which the present invention is applied and that embodiments of portable terminals to which the present invention is applied are not limited to the configuration above.

The portable terminal 1, for example, may be configured to be switched to another mode of use as described below in addition to the four modes of use mentioned above. That is to say, the switching from the second mode of use in FIG. 3 to a mode where the first input key group 11 is exposed may be obtained by sliding the casing 10 for simple operation relative to the casing 20 for complicated operation. This will widen the width of complicated operation operated using many input keys.

When used in such a manner, however, the first input key group 11 needs to be configured so as to match two cases, i.e., one with the display screen 31 used in a landscape view and the other used in a portrait view. To be concrete, indications that match both portrait and landscape views of the display screen 31 may be placed on input keys or between input keys, for example.

Figure 6:
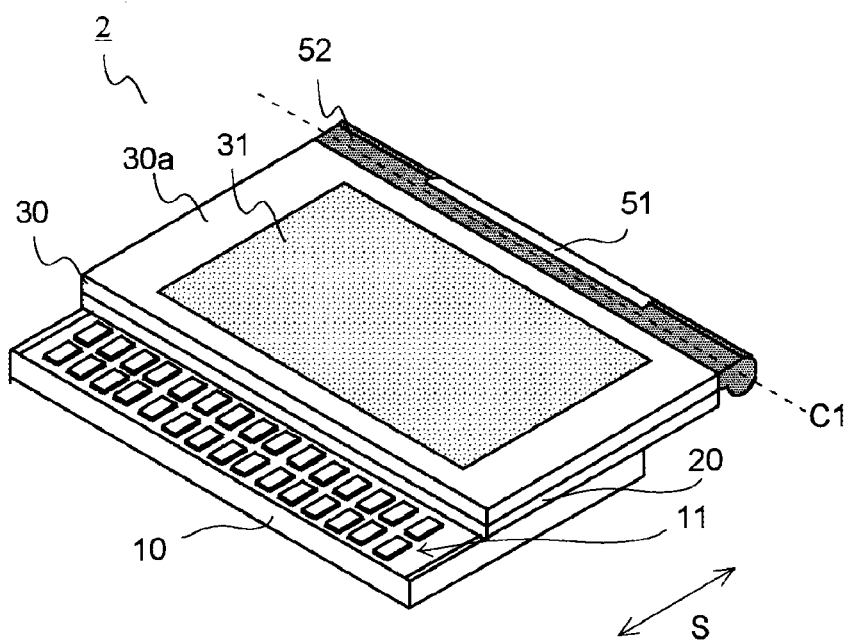
FIG. 6 is a view illustrating another embodiment of the present invention.

The embodiment mentioned above uses a configuration where the sliding direction of the casing using the slide section 40 is approximately parallel to the rotation axis (the first rotation axis C1) around which the casing is rotated with the first hinge section 50. A configuration, however, may be used where the sliding direction S of the casing is approximately perpendicular to the first rotation axis C1, as in a portable terminal 2 shown in FIG. 6.

Figure 7:
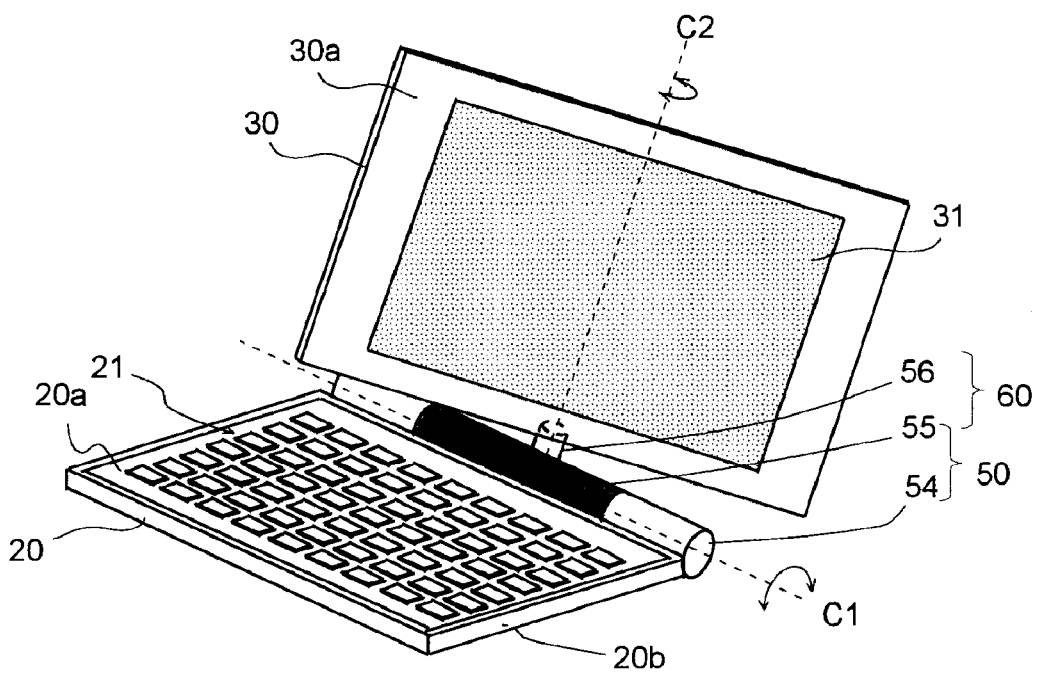
FIG. 7 is a view illustrating another embodiment of the present invention.
Figure 8A:
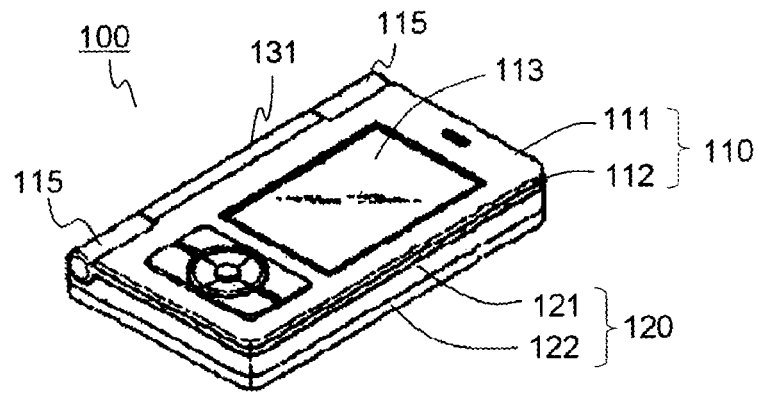
FIG. 8A is a schematic perspective a view illustrating a configuration of a conventional portable terminal, showing a closed state.
Figure 8B:
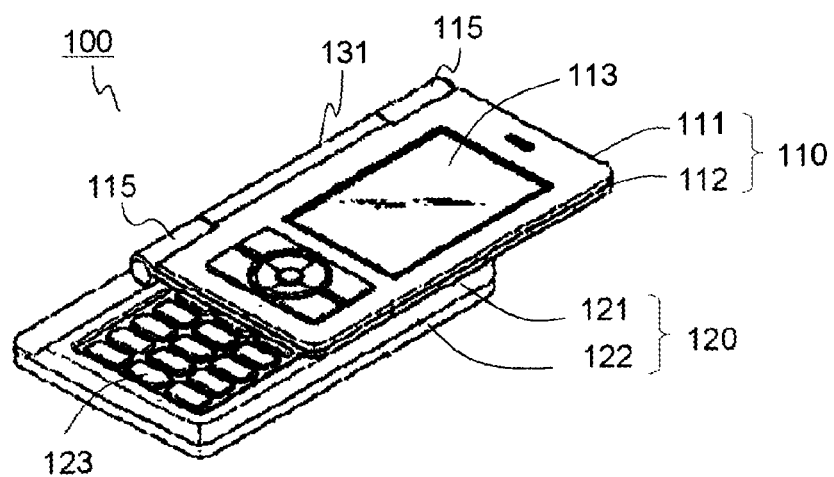
FIG. 8B is a schematic perspective view illustrating the configuration of the conventional portable terminal, showing an open state after sliding the second casing relative to the first casing.
Figure 8C:
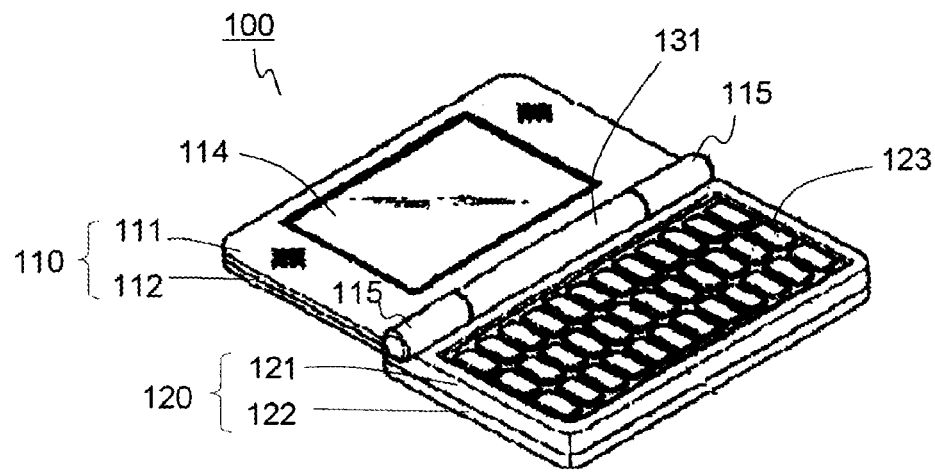
FIG. 8C is a schematic perspective view illustrating the configuration of the conventional portable terminal, showing another open state after rotating, with a hinge, the first casing relative to the second casing.

The configuration of the first hinge section according to the present invention is not limited to the embodiment mentioned above. That is to say, the first hinge section 50 may comprise a pair of bearing sections 54 fixedly disposed on the casing 20 for complicated operation, and axis member 55 rotatably supported relative to the pair of bearing sections 54, as shown in FIG. 7. In this case, the second hinge section 60 may be configured with axis section 56 (similar to the second axis section 53 of the present embodiment) fixed to the casing for display 30, and above axis member 55 that configures the first hinge section 50 that rotatably supports the axis section 56 fixed to the casing for display 30, as shown in FIG. 7.

Although the above embodiment uses a configuration where the first hinge section 50 is provided on the side face of a longer side of the casing 20 for complicated operation, the first hinge section 50 may be provided on a shorter side of the casing 20 for complicated operation. In this case, the sliding direction of the casing 10 for simple operation relative to the casing 20 for complicated operation may be the same as the direction of the shorter sides.

The present invention is suitable for portable terminals represented by mobile devices such as, for example, cellular phones, PDAs and smartphones.

What is claimed is:

1. A portable terminal having a first casing, a second casing and a third casing overlapped in the order from the bottom toward the top, the portable terminal comprising:
   a slide section slidably coupling the first casing and the second casing;
   a first hinge section rotatably coupling the second casing and the third casing around a first rotation axis; and
   a second hinge section that enables the third casing to be rotatable relative to the second casing around a second rotation axis that is approximately perpendicular to the first rotation axis,
   wherein the first casing is provided with a first input key group that is switchable between a covered state and an exposed state with slide movement using the slide section, and
   wherein the second casing is provided with a second input key group that is switchable between a covered state and an exposed state with rotation movement using the first hinge section, and wherein the third casing is provided with a display screen.

2. The portable terminal according to claim 1, wherein the first rotation axis is approximately parallel to the sliding direction of the slide section.

3. The portable terminal according to claim 1, wherein the display screen is approximately rectangular, and
   wherein the sliding direction of the slide section and the first rotation axis are approximately parallel to the direction of the longer sides of the display screen.

\* \* \* \* \*